(12) United States Patent
Wisgo

(10) Patent No.: US 11,582,177 B2
(45) Date of Patent: Feb. 14, 2023

(54) EMAIL TRACKING

(71) Applicant: CITRIX SYSTEMS, INC., Burlington, MA (US)

(72) Inventor: Jeffrey David Wisgo, Portland, OR (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 35 days.

(21) Appl. No.: 16/591,505

(22) Filed: Oct. 2, 2019

(65) Prior Publication Data

US 2021/0105237 A1    Apr. 8, 2021

(51) Int. Cl.
*H04L 51/212* (2022.01)
*H04L 51/42* (2022.01)
*H04L 51/214* (2022.01)
*H04L 51/043* (2022.01)

(52) U.S. Cl.
CPC .......... *H04L 51/212* (2022.05); *H04L 51/043* (2013.01); *H04L 51/214* (2022.05); *H04L 51/42* (2022.05)

(58) Field of Classification Search
None
See application file for complete search history.

(56) References Cited

U.S. PATENT DOCUMENTS

| | | | | |
|---|---|---|---|---|
| 5,878,230 A * | 3/1999 | Weber | ...................... | H04L 51/02 709/238 |
| 7,237,009 B1 * | 6/2007 | Fung | ...................... | G06Q 10/00 709/206 |
| RE41,940 E * | 11/2010 | Aronson | ............. | H04L 63/0227 709/206 |
| 2005/0138127 A1 * | 6/2005 | Jain | ...................... | G06Q 10/107 709/229 |
| 2007/0067394 A1 * | 3/2007 | Adams | ................. | G06Q 10/107 709/206 |
| 2008/0155026 A1 | 6/2008 | Daniels-Farrar et al. | | |
| 2008/0168269 A1 * | 7/2008 | Wilson | ................... | G06Q 10/00 713/160 |
| 2008/0208988 A1 * | 8/2008 | Khouri | ................. | G06Q 10/107 709/206 |

(Continued)

OTHER PUBLICATIONS

International Search Report and Written Opinion issued in International Application No. PCT/US2020/053836, dated Jan. 26, 2021 (Jan. 26, 2021). 11 Pages.

*Primary Examiner* — Chris Parry
*Assistant Examiner* — Abderrahmen Chouat

(57) ABSTRACT

A method may include assigning, to a category, a current email in response to a removal of one or more recipients of the current email, such that the remaining recipients of the current email are part of a same user group. The current email may be a response to a previous email having one or more recipients who are not part of the same user group. Furthermore, a subsequent email responding to the current email and/or is similar to the current email may also be assigned to the same category. One or more actions may be performed based on the current email and the subsequent email being assigned to the category. The actions may be performed to prevent the current email and the subsequent email from being sent to a recipient who is not part of the same user group. Related systems and computer program products are also provided.

16 Claims, 7 Drawing Sheets

(56) References Cited

U.S. PATENT DOCUMENTS

2008/0295000 A1* 11/2008 Kieselbach ............ G06Q 10/00
                                                      715/752
2010/0169344 A1    7/2010 Ellis et al.
2012/0158728 A1*  6/2012 Kumar .................... G06F 16/48
                                                      707/737
2012/0185797 A1*  7/2012 Thorsen ................. G06Q 10/00
                                                      715/784

* cited by examiner

EMAIL TRACKING

BACKGROUND

Electronic messages such as e-mails may be exchanged between one or more electronic devices. For example, a sender device may send an email by at least connecting to an email server and sending the email to the email server. The email server may store the email before delivering the email when one or more recipients of the email connect to the email server. Despite the proliferation of alternative technologies such as messaging clients, emails remain a primary mode of communication, especially for business or enterprise communications. For instance, senders within an enterprise may use emails to communicate with recipients both inside and outside of the enterprise.

SUMMARY

Systems, methods, and articles of manufacture, including computer program products, are provided for tracking emails. In some example embodiments, there is provided a system that includes at least one processor and at least one memory. The at least one memory may include program code that provides operations when executed by the at least one processor. The operations may include: assign, to a first category, a current email in response to a removal of one or more recipients of the current email, such that a remaining plurality of recipients of the current email are part of a same user group; and prevent, based at least on the current email being assigned to the first category, the current email from being sent to a recipient who is not part of the same user group.

In some variations, one or more features disclosed herein including the following features can optionally be included in any feasible combination. The current email may be a reply or a forward of a previous email. The previous email may include the one or more recipients who are not part of the same user group.

In some variations, the current email may be prevented from being sent to the recipient who is not part of the same user group by at least one of generating an alert in response to one or more of adding the recipient who is not part of the same user group, sending of the current email to the recipient who is not part of the same user group, and modifying the remaining plurality of recipients.

In some variations, the current email may be prevented from being sent to the recipient who is not part of the same user group by at least one of generating an alert in response to one or more of adding the recipient who is not part of the same user group, sending of the current email to the recipient who is not part of the same user group, and modifying the remaining plurality of recipients.

In some variations, a subsequent email may be assigned to the first category. The subsequent email may be prevented from being sent to the recipient who is not part of the same user group based at least on the subsequent email being assigned to the first category.

In some variations, the subsequent email may be assigned to the first category based at least on the subsequent email being a reply or a forward of the current email.

In some variations, the subsequent email may be assigned to the first category based at least on the subsequent email being similar to the current email. The subsequent email may be similar to the current email based at least on the subsequent email having at least one of a similar title, a similar recipient, and a similar extension as the current email.

In some variations, the subsequent email may be assigned to the first category based at least on a first content of the current email matching a second content of the subsequent email. The first content may be a first text included in a first body or a first attachment of the first email. The second content may be a second text included in a second body or a second attachment of the second email.

In some variations, a first value corresponding to the first content of the current email may be generated. The first value may be a first checksum or a first fingerprint corresponding to the first content of the current email. A second value corresponding to the second content of the subsequent email may be generated. The second value may be a second checksum or a second fingerprint corresponding to the second content of the subsequent email. The first content of the current email may be determined to match the second content of the subsequent email based at least on the first value matching the second value.

In some variations, a metadata associated with the current email may be updated to at least indicate the current email as being assigned to the first category. The metadata may include information describing the current email. The subsequent email may be determined to be assigned to the first category based at least on the metadata associated with the current email.

In some variations, wherein the subsequent email may be prevented from being sent to the recipient who is not part of the same user group by at least preventing one or more of adding the recipient who is not part of the same user group and sending the subsequent email to the recipient who is not part of the same user group.

In some variations, the subsequent email may include the remaining plurality of recipients from the current email. The subsequent email may be prevented from being sent to the recipient who is not part of the same user group by at least preventing the remaining plurality of recipients from being modified.

In some variations, the same user group may be defined to at least one of include a first domain and exclude a second domain.

In some variations, the same user group may be defined to at least one of include a first recipient from a domain and exclude a second recipient from a same domain.

In some variations, at least one of an email server and an email client may be configured to assign the current email to the first category and perform the first action to at least prevent the current email from being sent to the recipient who is not part of the same user group.

In some variations, the current email may be assigned, based at least on a policy, to the first category. The policy may define at least one of a first recipient included in the same user group and a second recipient excluded from the same user group.

In some variations, the policy may further specify one or more actions that are performed in response to the current email being assigned to the first category. The one or more actions may be performed to prevent the current email from being sent to the recipient who is not part of the same user group.

In another aspect, there is provided a method for tracking emails. The method may include: assigning, to a category, a current email in response to a removal of one or more recipients of the current email, such that a remaining plurality of recipients of the current email are part of a same user group, the current email being a reply or a forward of a previous email having the one or more recipients who are not part of the same user group; and preventing, based at least on the current email being assigned to the category, the current email from being sent to a recipient who is not part of the same user group.

In another aspect, there is provided a computer program product that includes a non-transitory computer readable storage medium. The non-transitory computer-readable storage medium may include program code that causes operations when executed by at least one data processor. The operations may include: assigning, to a category, a current email in response to a removal of one or more recipients of the current email, such that a remaining plurality of recipients of the current email are part of a same user group, the current email being a reply or a forward of a previous email having the one or more recipients who are not part of the same user group; and preventing, based at least on the current email being assigned to the category, the current email from being sent to a recipient who is not part of the same user group.

Implementations of the current subject matter can include, but are not limited to, methods consistent with the descriptions provided herein as well as articles that comprise a tangibly embodied machine-readable medium operable to cause one or more machines (e.g., computers and/or the like) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems and/or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
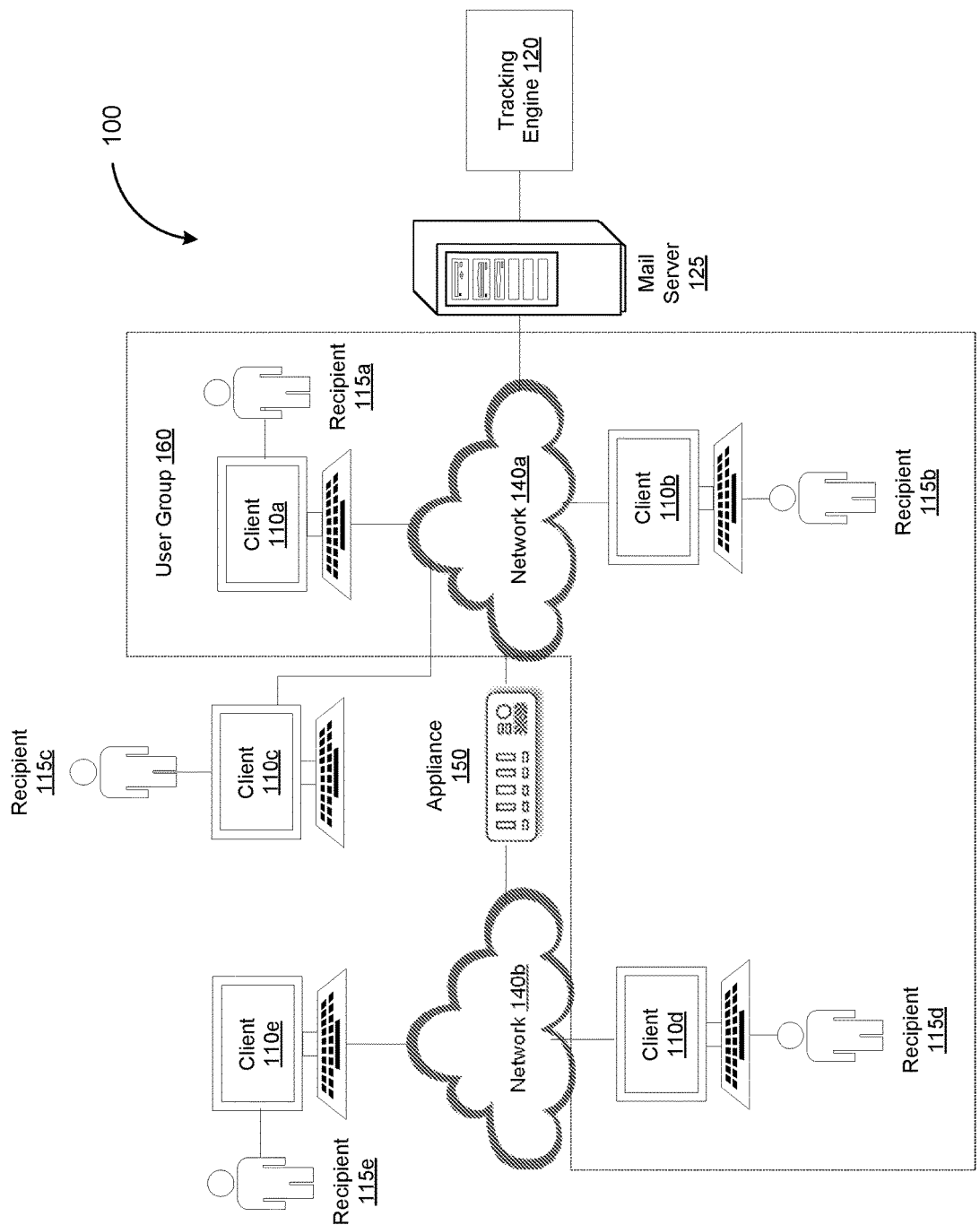
FIG. 1 depicts a system diagram illustrating an example of an email system, in accordance with some example embodiments.

Preventing the dissemination of data to unauthorized third parties may be a component of enterprise data security. To that end, an enterprise (e.g., a corporation, a government agency, and/or the like) may impose one or more policies that forbid a sender within the enterprise from sending, to recipients outside of the enterprise, emails containing sensitive information. For example, emails containing sensitive information may be marked with "DO NOT FORWARD" or "INTERNAL ONLY." Nevertheless, such markings do not prevent emails containing sensitive information from being inadvertently or deliberately sent to an unauthorized third party. As such, in some example embodiments, a tracking engine may be configured to perform one or more actions to prevent the email from being sent to an unauthorized recipient.

In some example embodiments, an email may be assigned to one or more categories based on whether the recipients of the email are part of the same user group. For example, the user group may be defined to include recipients who are internal to an enterprise and/or to exclude recipients who are external to the enterprise. Accordingly, the tracking engine may categorize the email as "INTERNAL ONLY" if the email does not include recipients who are external to the enterprise. By contrast, the tracking engine may categorize the email as "UNRESTRICTED" if the email includes recipients who are external to the enterprise. Once the email is categorized as "INTERNAL ONLY," the tracking engine may also categorize, as "INTERNAL ONLY," a subsequent email responding to the email. Alternatively, if the email is categorized as "UNRESTRICTED" and the external recipients are removed from a subsequent email responding to the email, the tracking engine may categorize the subsequent email as "INTERNAL ONLY." The tracking engine may prevent emails categorized as "INTERNAL ONLY" from being sent to recipients who are external to the enterprise and may prevent the addition of external recipients.

In some example embodiments, the tracking engine may assign a category to similar emails. For example, the tracking engine may assign a first email (which has a similar subject line, recipients, and/or extension as a second email) to a same category as the second email. Alternatively and/or additionally, the tracking engine may assign, to the same category, emails having identical, or at least some of the same, content. For instance, the tracking engine may determine a first checksum representative of a first content of a first email and a second checksum representative of a second content of a second email. The first checksum and the second checksum may be a parity word, a modular sum, a Fletcher's checksum, an Adler-32 checksum, a cyclic redundancy check, and/or the like. As used herein, the "content" of an email may refer to at least a portion of the text included in a body of the email or an attachment included in the email. The first email may be assigned to a same category as the second email if the first checksum of the first content of the first email matches the second checksum of the second content of the second email.

Instead of checksums, it should be appreciated that the first content of the first email may be determined to be identical to the second content of the second email if a first fingerprint of the first email matches a second fingerprint of the second email. The first fingerprint of the first content and the second fingerprint of the second content may be determined by applying a fingerprinting algorithm such as, for example, Rabin's algorithm or a cryptographic hash function (e.g., message digest algorithm (MD5), secure hash algorithm (SHA), and/or the like).

FIG. 1 depicts a system diagram illustrating an example of an email tracking system 100, in accordance with some example embodiments. Referring to FIG. 1, the email tracking system 100 may include a first client 110a, a second client 110b, a third client 110c, a fourth client 110d, a fifth client 110e, and a tracking engine 120. As shown in FIG. 1, the tracking engine 120 may be deployed at a mail server 125 that is communicatively coupled with the first client 110a, the second client 110b, and the third client 110c via a first network 140a. However, it should be appreciated that at least some functionalities of the tracking engine 120 may be implemented locally, for example, at the first client 110a, the second client 110b, the third client 110c, the fourth client 110d, and/or the fifth client 110e. Moreover, the fourth client 110d and the fifth client 110e may be communicatively coupled via a second network 140b.

In the example shown in FIG. 1, the first network 140a may be an internal network of an enterprise, which may be an intranet restricted to a defined group of users. For instance, the first network 140a may be accessible to the first client 110a, the second client 110b, and the third client 110c but not the fourth client 110d and the fifth client 110e. By contrast, the second network 140b may be an external network (e.g., the Internet) of the enterprise accessible to an unrestricted group of users.

The first client 110a, the second client 110b, the third client 110c, the fourth client 110d, and the fifth client 110e may each be a processor-based device including, for example, a smartphone, a tablet computer, a wearable apparatus, a virtual assistant, an Internet-of-Things (IoT) appliance, and/or the like. Meanwhile, the first network 140a and the second network 140b may be any wired and/or wireless network including, for example, a local area network (LAN), a virtual local area network (VLAN), a wide area network (WAN), a public land mobile network (PLMN), the Internet, and/or the like. As shown in FIG. 1, an appliance 150 may be deployed between the first network 140a and the second network 140b to at least manage communication between the first network 140a and the second network 140b.

An enterprise may impose one or more policies that determine the authorized recipients of an email originating from a sender within the enterprise. In some example embodiments, the application of the policies may include performing actions to prevent the email originating from the sender within the enterprise from being sent to an unauthorized recipient. For example, the authorized recipients of the email may be determined based on a user group, which may be defined to include recipients associated with a first domain and/or to exclude recipients associated with a second domain. Alternatively and/or additionally, the user group may be defined to include a first recipient associated with the first domain and/or to exclude a second recipient associated with the first domain. Accordingly, the tracking engine 120 may apply the one or more policies by at least performing one or more actions to prevent the email from being sent to the second recipient associated with the first domain as well as a third recipient associated with the second domain.

To further illustrate, FIG. 1 shows a user group 160, which may be defined by a policy to include a first recipient 115a at the first client 110a and a second recipient 115b at the second client 110b. And, the user group 160 may be defined to exclude a third recipient 115c at the third client 110c. As shown in FIG. 1, the first recipient 115a, the second recipient 115b, and the third recipient 115c may be recipients who are internal to the enterprise such that the email addresses of the first recipient 115a (e.g., recipient1@companyA.com), the second recipient 115b (e.g., recipient2@companyA.com), and the third recipient 115c (e.g., recipient3@companyA.com) may include a same domain (e.g., acme). The user group 160 may nevertheless be defined to exclude the third recipient 115c in order to restrict the dissemination of information within the enterprise.

Alternatively and/or additionally, the user group 160 may be defined to include a fourth recipient 115d at the fourth client 110d, who may be a recipient external to the enterprise. For instance, the email address of the fourth recipient 115d (e.g., recipient4@companyB.com) may include a different domain than the email addresses of the first recipient 115a, the second recipient 115b, and the third recipient 115c. Nevertheless, the user group 160 may be defined to include the fourth recipient 115d in order to enable communication between employees who are internal to the enterprise and customers, vendors, and the like who are external to the enterprise.

In some example embodiments, the tracking engine 120 may categorize an email based at least on the recipients of the email. For example, the email may be assigned to a first category based at least on the recipients of the email being part of a same user group. The first category may be, for example, "INTERNAL ONLY," "DO NOT FORWARD," and/or the like. By contrast, if the email includes recipients who are not part of the same user group, the tracking engine may assign the email to a second category. The second category may be, for example, "UNRESTRICTED" and/or the like. As such, the email may be assigned to the first category if the recipients of the email include the first recipient 115a, the second recipient 115b, and the fourth recipient 115d are part of the user group 160. By contrast, the email may be assigned to the second category if the recipients of the email further include the third recipient 115c or a fifth recipient 115e at the fifth client 115e whose email address (e.g., recipient5@companyC.com) include a domain excluded from the user group 160.

In response to the email being assigned to the first category, the tracking engine 120 may perform one or more actions to prevent the email from being sent to an unauthorized recipient that is not part of the user group 160. For instance, the tracking engine 120 may prevent an action defined in the policy from being performed such as an addition of a recipient who is not part of the user group 160, a sending of the email to the recipient who is not part of the user group, and a modification of the recipients who are part of the user group 160. The tracking engine 120 may also generate an alert in response to the performance of the unauthorized action. Furthermore, the tracking engine 120 may log the unauthorized action including by generating one or more log entries corresponding to the unauthorized action. Alternatively, if the email is assigned to the second category, the tracking engine 120 may permit the recipients of the email to be modified to include recipients who are part of different user groups. Furthermore, the tracking engine 120 may permit the email assigned to the second category to be sent to recipients who are part of different user groups.

In some example embodiments, the tracking engine 120 may assign, to the first category, the email in response to the removal of one or more recipients who are not part of the user group 160 such as, for example, the third recipient 115c and the fifth recipient 115e. For example, the email may respond to a previous email by a least forwarding the previous email or replying to the previous email. The previous email may include the third recipient 115c and/or the fifth recipient 115e. The tracking engine 120 may assign, to the first category, the email when the email is drafted to exclude the third recipient 115c and/or the fifth recipient 115e. Moreover, the tracking engine 120 may further assign, to the first category, one or more subsequent emails forwarding and/or replying to the email.

Figure 2:
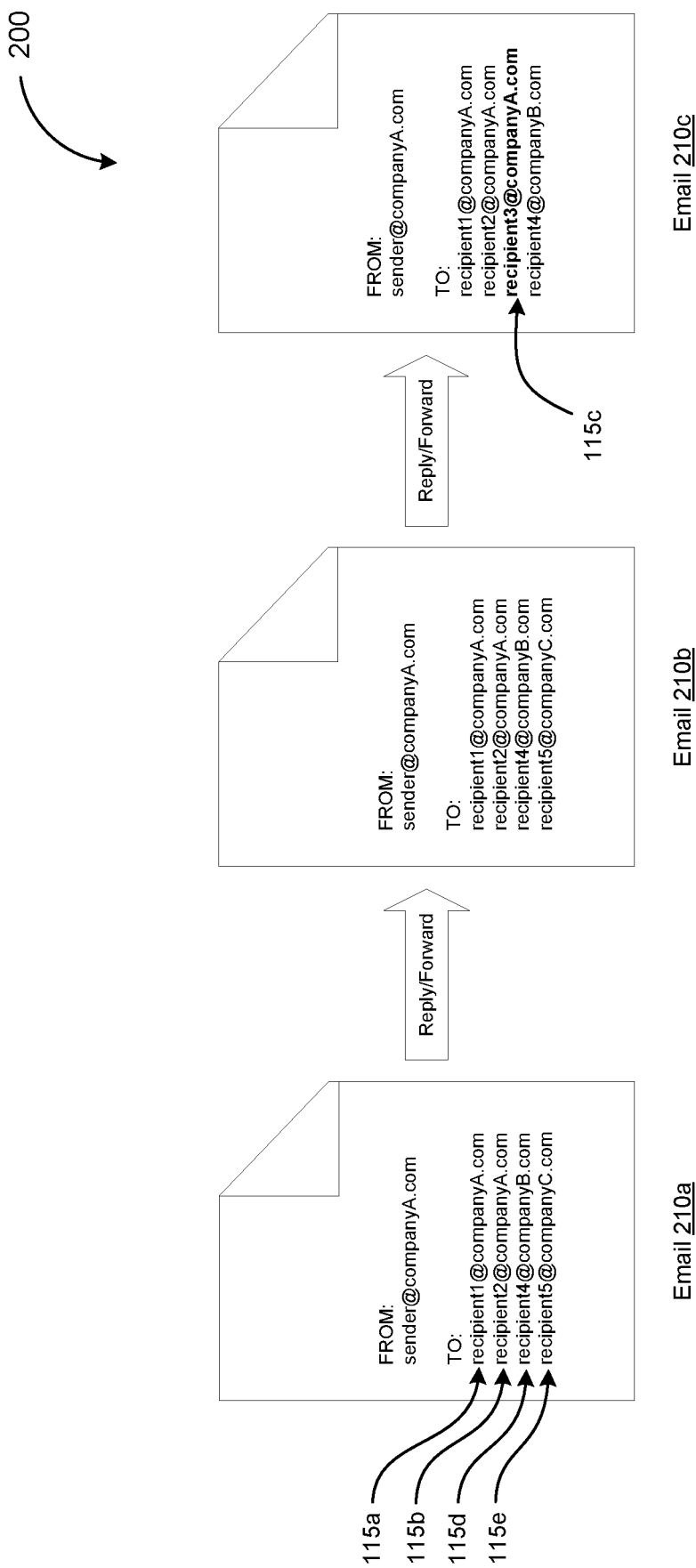
FIG. 2 depicts an example of an email chain, in accordance with some example embodiments.

To further illustrate, FIG. 2 depicts an example of an email chain 200, in accordance with some example embodiments. As shown in FIG. 2, the email chain 200 may include a first email 210a, a second email 210b that is forwarding (or replying) to the first email 210a, and a third email 210c that is forwarding (or replying) to the second email 210b. In some example embodiments, the tracking engine 120 may assign, to the second category, the first email 210a based at least on the recipients of the first email 210a including the fifth recipient 115e (e.g., recipient5@companyC.com), who is not part of the user group 160 that includes the first recipient 115a, the second recipient 115b, and the fourth recipient 115d.

In response to the second email 210b being drafted to exclude the fifth recipient 115e, the tracking engine 120 may assign, to the first category, the second email 210b based at least on the remaining recipients of the second email 210b being part of the user group 160 (e.g., the first recipient 115a, the second recipient 115b, and the fourth recipient 115d). Based on the second email 210b being assigned to the first category, the tracking engine 120 may perform one or more actions to prevent the second email 210b from being sent to an unauthorized recipient, which may include recipients who are not part of the user group 160. For example, the tracking engine 120 may prevent an unauthorized action from being performed such as the addition of a recipient who are not part of the user group 160, the sending of the second email 210b to a recipient who is not part of the user group 160, and/or the modification of the recipients of the second email 210b. Alternatively and/or additionally, the tracking engine 120 may generate an alert in response to the performance of the unauthorized action and/or generate one or more log entries indicating the performance of the unauthorized action.

Referring again to FIG. 2, the tracking engine 120 may further assign, based on the third email 210c being a forward of (or a reply to) the second email 210b, the third email 210c to the first category. Accordingly, the tracking engine 120 may also perform one or more actions to prevent the third email 210c from being sent to an unauthorized recipient who is not part of the user group 160.

In some example embodiments, the tracking engine 120 may update a metadata associated with an email in order to indicate a category assigned to the email. The metadata associated with the email may include information describing the email including, for example, a subject, a sent date, a recipient, an attachment, and/or the like. Accordingly, the tracking engine 120 may update the metadata associated with the second email 210b in order to indicate that the second email 210b is assigned to the first category. When the third email 210c is composed as a forward or a reply to the second email 210b, the tracking engine 120 may determine, based at least on the metadata associated with the second email 210b, the second email 210b is assigned to the first category. Accordingly, the tracking engine 120 may also assign the third email 210c to the same category as the second email 210b.

In some example embodiments, the tracking engine 120 may further categorize a first email based on the categorization of a second email similar to the first email. For instance, the tracking engine 120 may assign the first email to a same category as the second email based at least on the first email and the second email having similar subject lines (e.g., with more than a threshold quantity of same and/or similar keywords), recipients, and/or recipients. Alternatively and/or additionally, the tracking engine 120 may categorize a first email based on the categorization of a second email having at least some content that is identical to the content of the first email. For example, the tracking engine 120 may determine a first checksum for a first content of the first email and a second checksum for a second content of the second email. The tracking engine 120 may further assign the first email to a same category as the second email based at least on the first checksum matching the second checksum.

In some example embodiments, the tracking engine 120 may store, at the mail server 125, one or more checksums and/or fingerprints of content from various emails as well as the categories assigned to the email associated with each checksum. The tracking engine 120 may store the checksums at the mail server 125 instead of the actual content of the corresponding emails. As used herein, the "content" of an email may refer to a portion of the text included in a body of the email or an attachment included in the email. Instead of the content of the first email, for example, the first checksum of the first content of the first email may be stored at the mail server 125 along with the category assigned to the first email. As such, in order to determine a category for the second email, the tracking engine 120 may compare the second checksum computed for the email against the one or more checksums stored at the mail server 125 and assign, to the second email, the category assigned to the email associated with the checksum matching the second checksum of the second email.

Figure 3:
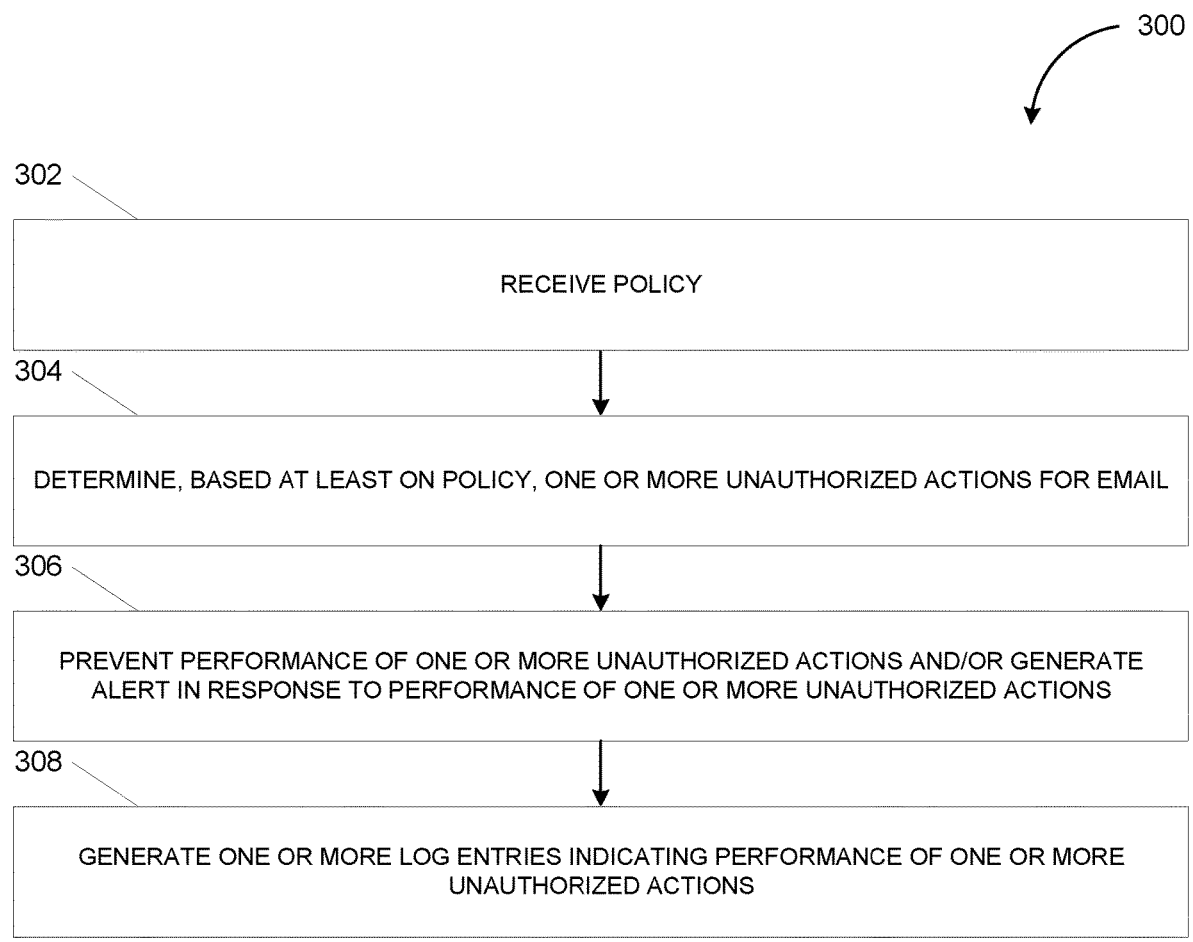
FIG. 3 depicts a flowchart illustrating an example of a process for email tracking, in accordance with some example embodiments.

FIG. 3 depicts a flowchart illustrating a process 300 for email tracking, in accordance with some example embodiments. Referring to FIGS. 1 and 3, the process 300 may be performed by the tracking engine 120 in order to prevent an email from being sent to an authorized recipient.

At 302, the tracking engine 120 may receive a policy. In some example embodiments, the tracking engine 120 may receive a policy defining a user group. The policy may specify the recipients to include and/or to exclude from the user group. For example, the tracking engine 120 may receive a policy defining the user group 160 to include recipients from a first domain (e.g., companyA) and/or exclude recipients from a second domain (e.g., companyB). Alternatively and/or additionally, the policy may define the user group 160 to include and/or exclude specific recipients from the first domain. Accordingly, as shown in FIG. 1, the user group 160 may be defined to include the first recipient 115*a*, the second recipient 115*b*, and the fourth recipient 115*d* and/or exclude the third recipient 115*b* and the fifth recipient 115*e*.

In some example embodiments, the policy may specify the categorization of an email based on whether the recipients of the email are part of the user group. For example, the policy may specify that the email is assigned to a first category if the recipients of the email are part of the same user group defined by the policy to include the first recipient 115*a*, the second recipient 115*b*, and the fourth recipient 115*d* and/or exclude the third recipient 115*b* and the fifth recipient 115*e*. Alternatively and/or additionally, the policy may specify that the email is assigned to a second category if the recipients of the email are not part of the same user group. That is, the policy may specify that the email may be assigned to the second category if the recipients of the email include, for example, the third recipient 115*b* and/or the fifth recipient 115*e* excluded from the user group 160.

Furthermore, the policy may further specify one or more unauthorized actions (e.g., an action that is not allowed) for the email depending on whether the email is assigned to the first category or the second category. For example, if the email is assigned to the first category, an unauthorized action may include as an addition of a recipient who is not part of the user group 160, a sending of the email to the recipient who is not part of the user group, and/or a modification of the recipients who are part of the user group 160. The tracking engine 120 may further log the unauthorized action including by generating one or more log entries corresponding to the unauthorized action. By contrast, if the email is assigned to the second category, the tracking engine 120 may permit the recipients of the email to be modified to include recipients who are part of different user groups. Furthermore, the tracking engine 120 may permit the email assigned to the second category to be sent to recipients who are part of different user groups.

At 304, the tracking engine 120 may determine, based at least on the policy, one or more unauthorized actions for an email. For example, the tracking engine 120 may apply the policy to at least determine, based at least on the recipients of the email, whether to assign the email to the first category or the second category. Furthermore, the tracking engine 120 may apply the policy to at least determine, based at least on the email being assigned to the first category or the second category, one or more unauthorized actions for the email. As noted, if the email is assigned to the first category, an unauthorized action may include an addition of a recipient who is not part of the user group 160, a sending of the email to the recipient who is not part of the user group, and/or a modification of the recipients who are part of the user group 160. By contrast, if the email is assigned to the second category, the email may not be subject to any restrictions. Accordingly, the tracking engine 120 may permit the recipients of the email to be modified to include recipients who part of different user groups. Furthermore, the tracking engine 120 may permit the email assigned to the second category to be sent to recipients who are part of different user groups.

At 306, the tracking engine 120 may prevent a performance of the one or more unauthorized actions and/or generate an alert in response to the performance of the one or more unauthorized actions. For example, the tracking engine 120 may prevent the performance of an unauthorized action such as the addition of a recipient who is not part of the user group 160, the sending of the email to the recipient who is not part of the user group, and/or the modification of the recipients who are part of the user group 160. Alternatively and/or additionally, the tracking engine 120 may respond to the performance of an unauthorized action by generating an alert.

At 308, the tracking engine 120 may generate one or more log entries indicating the performance of the one or more unauthorized actions. In some example embodiments, the tracking engine 120 may further respond to the performance of an unauthorized action by logging the unauthorized action. For example, the tracking engine 120 may log the unauthorized action including by generating one or more log entries indicating the performance of the unauthorized action.

Figure 4:
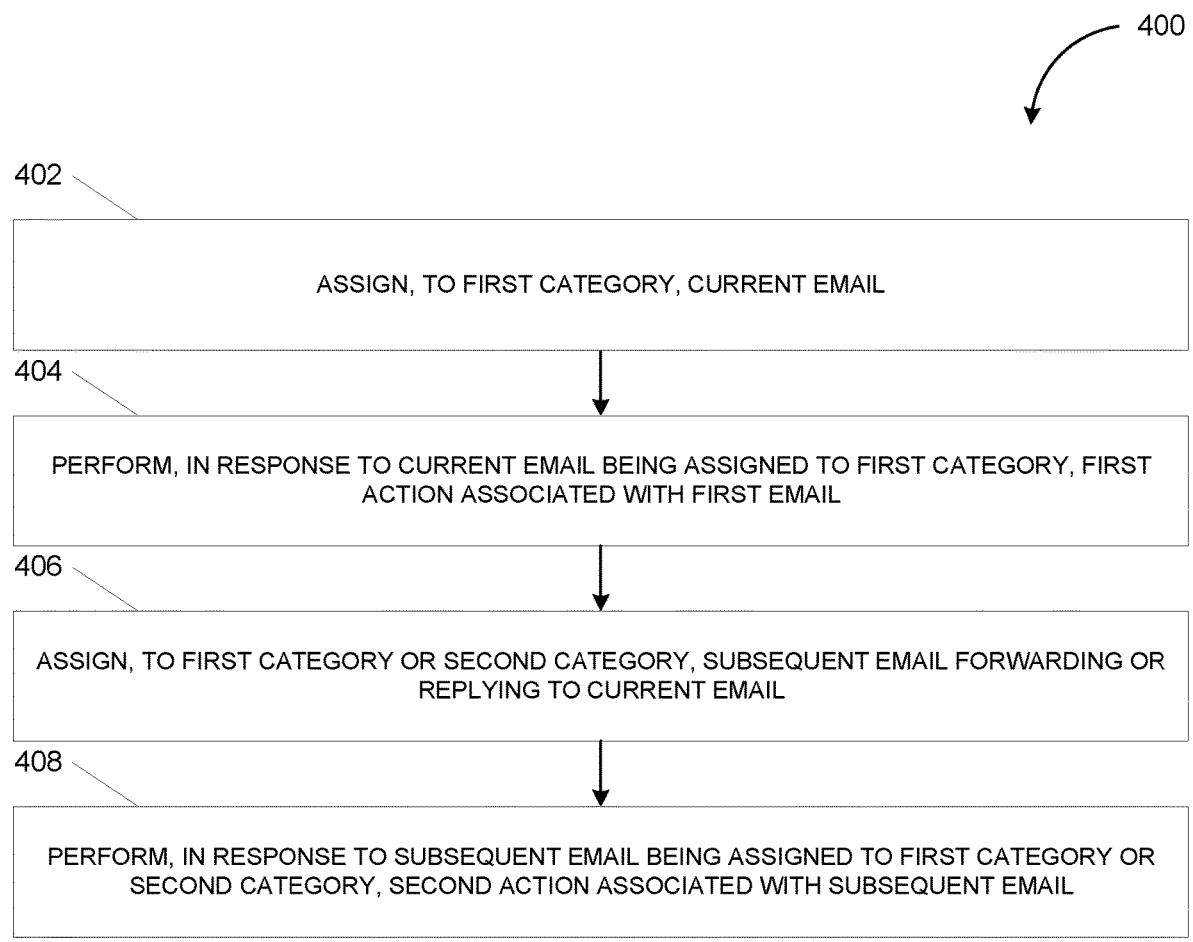
FIG. 4 depicts a flowchart illustrating an example of a process for email tracking, in accordance with some example embodiments.

FIG. 4 depicts a flowchart illustrating a process 400 for email tracking, in accordance with some example embodiments. Referring to FIG. 4, the process 400 may be performed by the tracking engine 120 in order to prevent an email from being sent to an authorized recipient.

At 402, the tracking engine 120 may assign, to a first category, a current email. For example, as shown in FIG. 2, the recipients of the first email 210*a* may include the first recipient 115*a*, the second recipient 115*b*, and the fourth recipient 115*d* who are part of the user group 160 as well as the fifth recipient 115*e* who is not part of the user group 160. Accordingly, the tracking engine 120 may assign, to the second category, the first email 210*a* based at least on the first email 210*a* including a recipient who is not part of the same user group. However, in some example embodiments, the second email 210*b* (which may be a forward (or a reply) to the first email 210*a*) may be drafted to exclude the fifth recipient 115*e* who is not part of the user group 160. As such, the tracking engine 120 may respond to the removal of the fifth recipient 115*e* from the recipients of the second email 210*b* by at least assigning, to the first category instead of the second category, the second email 210*b*.

At 404, the tracking engine 120 may perform, in response to the current email being assigned to the first category, a first action associated with the current email. In some example embodiments, in response to the first email 210*a* being assigned to the second category, the tracking engine 120 may permit the recipients of the first email 210*a* to be modified to include recipients who are part of different user groups. Furthermore, the tracking engine 120 may permit the first email 210*a* assigned to the second category to be sent to recipients who are part of different user groups.

By contrast, in response to the second email 210*b* being assigned to the first category, the tracking engine 120 may prevent an unauthorized action from being performed such as the addition of a recipient who is not part of the user group 160, the sending of the second email 210*b* to a recipient who is not part of the user group 160, and/or the modification of the recipients of the second email 210*b*. The tracking engine 120 may also generate an alert in response to the performance of the unauthorized action. Furthermore, the tracking engine 120 may further log the unauthorized action by at least generating one or more log entries indicating the performance of the unauthorized action.

At 406, the tracking engine 120 may assign, to the first category or a second category, a subsequent email forwarding or replying to the current email. As shown in FIG. 2, in some example embodiments, the tracking engine 120 may assign also assign the third email 210*c* to the first category based at least on the third email 210*c* being a forward (or a reply) to the second email 210b. By assigning the third email 210c to the same first category as the second email 210b, the tracking engine 120 may also perform the one or more actions to prevent the third email 210c from being sent to unauthorized recipients including, for example, recipients who are not part of the user group 160. Contrastingly, if the third email 210c is not assigned to the second category instead of the first category, the tracking engine 120 may permit the third email 210c to be sent to recipients who are part of different user groups.

At 408, the tracking engine 120 may perform, in response to the subsequent email being assigned to the first category or the second category, a second action associated with the subsequent email. For example, in response to the third email 210c being assigned to the first category, the tracking engine 210 may also prevent an unauthorized action from being performed. Examples of unauthorized actions include the addition of a recipient who is not part of the user group 160, the sending of the third email 210c to a recipient who is not part of the user group 160, the modification of the recipients who are part of the user group 160, and/or the like. The tracking engine 120 may also generate an alert in response to the performance of the unauthorized action. Furthermore, the tracking engine 120 may also log the unauthorized action by at least generating one or more log entries indicating the performance of the unauthorized action.

Figure 5A:
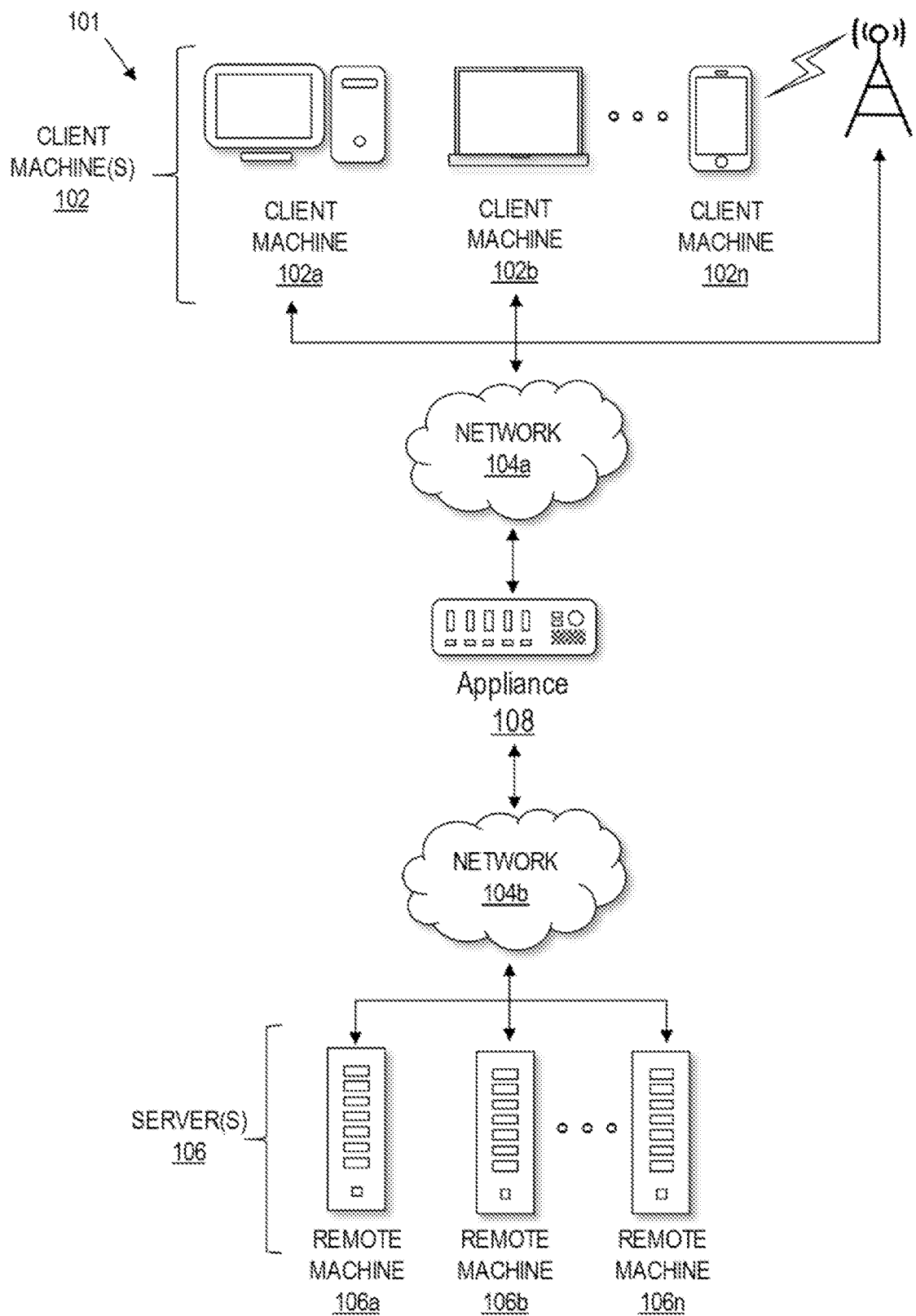
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1 and 5A, the network environment 101 in which various aspects of the disclosure may be implemented may include one or more clients 102a-102n, one or more remote machines 106a-106n, one or more networks 104a and 104b, and one or more appliances 108 installed within the network environment 101. The clients 102a-102n communicate with the remote machines 106a-106n via the networks 104a and 104b.

In some example embodiments, the clients 102a-102n may communicate with the remote machines 106a-106n via an appliance 108. The illustrated appliance 108 is positioned between the networks 104a and 104b, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104a and/or 104b.

The clients 102a-102n may be generally referred to as client machines, local machines, clients, client nodes, client computers, client devices, computing devices, endpoints, or endpoint nodes. The clients 102a-102n may include, for example, the first client 110a, the second client 110b, and/or the like. The remote machines 106a-106n may be generally referred to as servers or a server farm. In some example embodiments, a client 102 may have the capacity to function as both a client node seeking access to resources provided by a server 106 and as a server 106 providing access to hosted resources for other clients 102a-102n. The networks 104a and 104b may be generally referred to as a network 104. The networks 104 including the networks 104a and 104b may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the mail server 125 and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 102.

In yet other example embodiments, a server 106 may execute a virtual machine providing, to a user of a client 102, access to a computing environment. The client 102 may be a virtual machine. The virtual machine may be managed by, for example, a hypervisor, a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
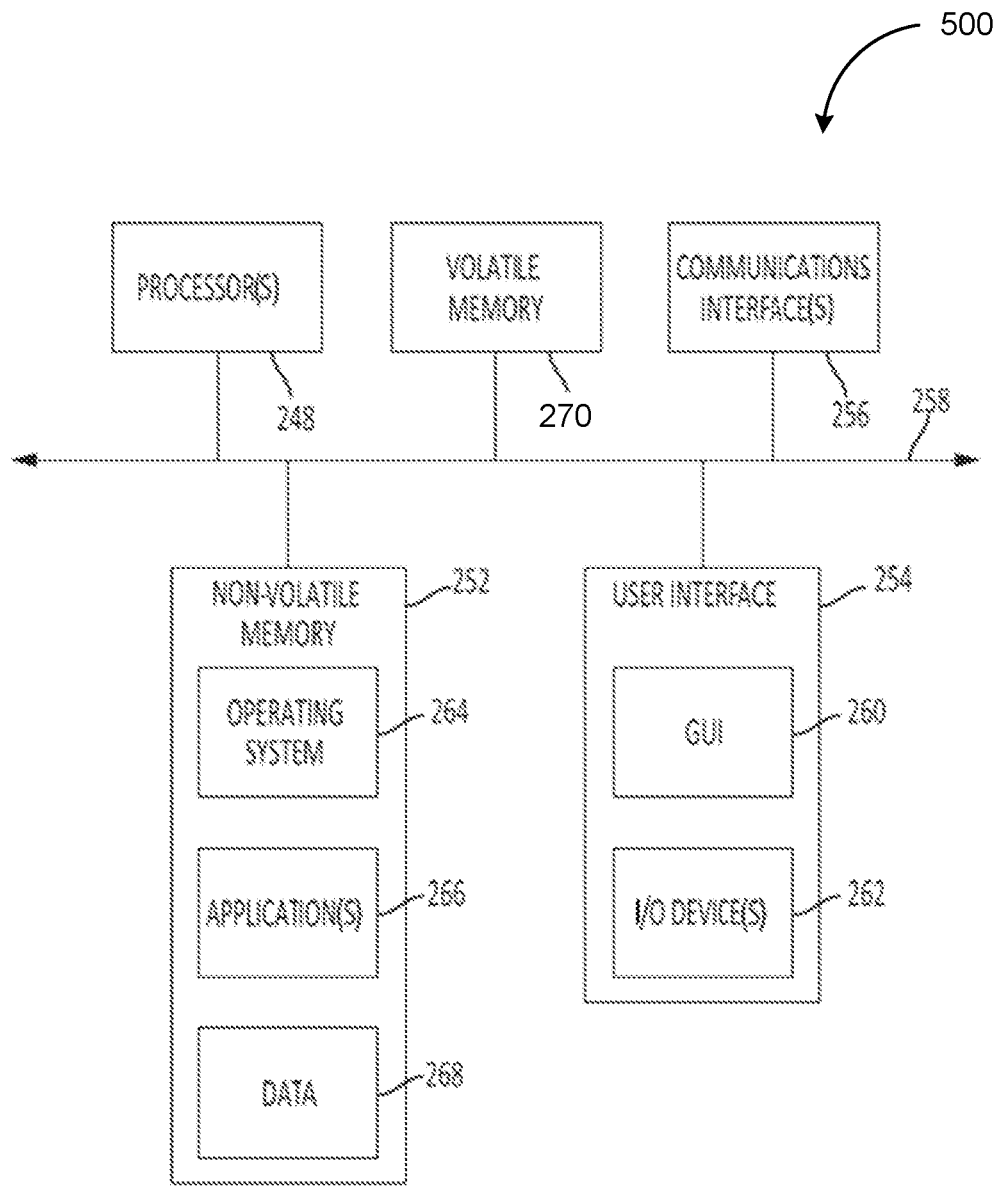
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1 and 5A-B, the computing device 500 may be useful for practicing an embodiment of the clients 102, the servers 106, and/or the appliances 108.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262

(e.g., a mouse, a keyboard, and/or the like). The non-volatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the communication bus 258. The computing device 500 as shown in FIG. 5B is shown merely as an example, as the clients 102, the servers 106, and the appliances 108 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 102), may execute a virtual machine, which provides an execution session within which applications execute on behalf of a user or a client computing device (e.g., the clients 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 5C:
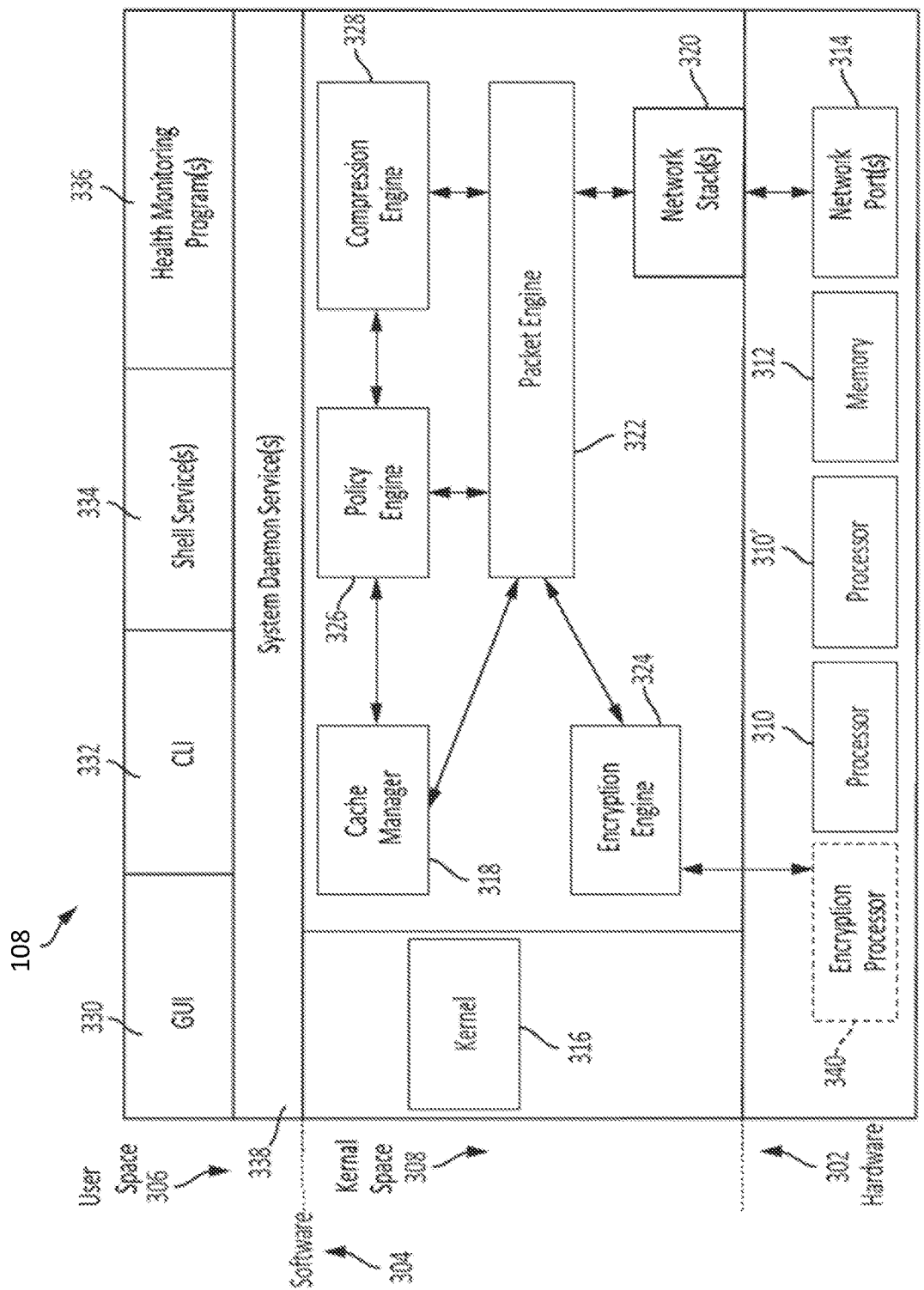
FIG. 5C depicts a block diagram illustrating an example of a network appliance, in accordance with some example embodiments.

FIG. 5C depicts a block diagram illustrating an example of the network appliance 108, in accordance with some example embodiments. The appliance 108 may be implemented as a server, gateway, router, switch, bridge or other type of computing or network device. As shown in FIG. 5C, in some example embodiments, the appliance 108 may include a hardware layer 302 and a software layer 304 divided into a user space 306 and a kernel space 308. The hardware layer 302 may provide the hardware elements upon which programs and services within the kernel space 308 and the user space 306 are executed, and may also permit programs and services within the kernel space 308 and the user space 306 to communicate data both internally and externally with respect to the appliance 108. As shown, the hardware layer 302 may include one or more processing units 310 for executing software programs and services, memory 312 for storing software and data, one or more network ports 314 for transmitting and receiving data over one or more networks 104, and an encryption processor 340 for encrypting and decrypting data such as in relation to Secure Socket Layer (SSL) or Transport Layer Security (TLS) processing of data transmitted and received over one or more networks 104.

An operating system (not shown in FIG. 5C) of the appliance 108 allocates, manages, or otherwise segregates the available system memory into the kernel space 308 and the user space 306. The kernel space 308 may be reserved for running a kernel 316, including any device drivers, kernel extensions or other kernel related software. As known to those skilled in the art, the kernel 316 is the core of the operating system, and provides access, control, and management of resources and hardware-related elements of the appliance 108. The kernel space 308 may also include a number of network services or processes working in conjunction with a cache manager 318.

The appliance 108 may include one or more network stacks 320, such as a TCP/IP based stack, for communicating with the client(s) 102, server(s) 106, network(s) 104a and 104b, and/or other appliances 108. For example, the appliance 108 may establish and/or terminate one or more transport layer connections between the client(s) 102 and the server(s) 106. Each network stack 320 may include a buffer for queuing one or more network packets for transmission by the appliance 108.

The kernel space 308 may include the cache manager 318, a packet engine 322, an encryption engine 324, a policy engine 326, and a compression engine 328. One or more of the processes 318, 322, 324, 326 and 328 may thus run in the core address space of the operating system of the appliance 108, which may reduce the number of data transactions to and from the memory and/or context switches between kernel mode and user mode, for example since data obtained in kernel mode may not need to be passed or copied to a user process, thread or user level data structure.

The cache manager 318 may duplicate original data stored elsewhere or data previously computed, generated or transmitted to reducing the access time of the data. In some example embodiments, the cache memory may be a data object in the memory 312 of the appliance 108, or may be a physical memory having a faster access time than memory the 312.

The policy engine 326 may include a statistical engine or other configuration mechanism to permit a user to identify, specify, define, or configure a caching policy and access, control and management of objects, data or content being cached by the appliance 108, and define or configure security, network traffic, network access, compression or other functions performed by the appliance 108.

The encryption engine 324 may process any security related protocol, such as SSL or TLS. For example, the encryption engine 324 may encrypt and decrypt network packets, or any portion thereof, communicated via the appliance 108, may setup or establish SSL, TLS or other secure connections, for example, between the client(s) 102, the server(s) 106, and/or one or more other appliances 108. In some example embodiments, the encryption engine 324 may use a tunneling protocol to provide a virtual private network (VPN) between a client 102 and a server 106. For example, in some example embodiments, the encryption engine 324 may be in communication with the encryption processor 340. The compression engine 328 may compress network packets bi-directionally between the client(s) 102 and the server(s) 106 and/or between one or more of the appliances 108.

The packet engine 322 may manage kernel-level processing of packets received and transmitted by the appliance 108 via the network stack(s) 320 to send and receive network packets via the network port(s) 314. The packet engine 322 may, for example, operate in conjunction with the encryption engine 324, the cache manager 318, the policy engine 326, and/or the compression engine 328 to perform encryption/decryption, traffic management such as request-level content switching and request-level cache redirection, and/or compression and decompression of data.

The user space 306 may be a memory area or portion of the operating system used by user mode applications or programs otherwise running in user mode. A user mode application may, for example, not access the kernel 316 directly and may instead use service calls in order to access kernel services. As shown in FIG. 5C, the user space 306 may, for example, include a graphical user interface (GUI) 330, a command line interface (CLI) 332, one or more shell services 334, one or more health monitoring programs 336, and/or one or more daemon services 338. The GUI 330 and/or the CLI 332 may enable a system administrator or other user to interact with and control the operation of the appliance 108, such as via the operating system of the appliance 108. The shell service(s) 334 may, for example, include programs, services, tasks, processes, and/or executable instructions to support interaction with the appliance 108 by a user via the GUI 330 and/or the CLI 332.

The health monitoring program(s) 336 may monitor, check, report and/or ensure that network systems are functioning properly and that users are receiving requested content over a network, for example, by monitoring activity of the appliance 108. In some example embodiments, the health monitoring program(s) 336 may intercept and inspect any network traffic passed via the appliance 108. For example, the health monitor program 336 may interface with one or more of the encryption engine 324, the cache manager 318, the policy engine 326, the compression engine 328, the packet engine 322, the daemon service(s) 338, and the shell service(s) 334 to determine a state, status, operating condition, and/or health of any portion of the appliance 108. Further, the health monitoring program(s) 336 may determine if a program, process, service and/or task is active and currently running, check status, error, and/or history logs provided by any program, process, service and/or task to determine any condition, status and/or error with any portion of the appliance 108. Additionally, the health monitoring program(s) 336 may measure and monitor the performance of any application, program, process, service, task, and/or thread executing on the appliance 108.

The daemon service(s) 338 are programs that run continuously or in the background and handle periodic service requests received by the appliance 108. In some example embodiments, a daemon service 338 may, for example, forward such requests to other programs and/or processes, such as another daemon service 338, as appropriate.

The appliance 108 may relieve the server(s) 106 of much of the processing load caused by repeatedly opening and closing transport layer connections to the client(s) 102 by opening one or more transport layer connections with each server 106 and maintaining these connections to permit repeated data accesses by the client(s) 102 via the Internet (e.g., "connection pooling"). To perform connection pooling, the appliance 108 may translate or multiplex communications by modifying sequence numbers and acknowledgment numbers at the transport layer protocol level (e.g., "connection multiplexing"). The appliance 108 may also provide switching and/or load balancing for communications between the client(s) 102 and the server(s) 106.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, cause the at least one data processor to at least:
   assign a current email to a first category based at least on the current email having at least one recipient who is not part of a user group defined to include recipients associated with a first domain but exclude recipients associated with a second domain;
   in response a removal of the at least one recipient who is not part of the user group, determine that a remaining plurality of recipients of the current email all belong to the user group;
   in response to determining that the remaining plurality of recipients of the current email all belong to the user group, update a metadata associated with a current email to indicate the current email as being assigned to a second category, the metadata associated with the current email further including a first value representative of a first content of the current email;
   assign, based at least on the first value failing to match a second value representative of a second content of a subsequent email, the subsequent email to the first category to enable the subsequent email to be sent to a recipient associated with the second domain;
   assign, based at least on the first value matching the second value representative of the second content of the subsequent, the subsequent email to the second category; and
   prevent, based at least on the current email and the subsequent email being assigned to the second category, the current email and the subsequent email from being sent to the recipient associated with the second domain, the current email and the subsequent email being prevented from being sent to the recipient associated with the second domain by at least preventing the recipient associated with the second domain from being added to the current email and the subsequent email.

2. The system of claim 1, wherein the current email comprises a reply or a forward of a previous email, and wherein the previous email includes the one or more recipients associated with the second domain.

3. The system of claim 2, wherein the previous email is assigned to the first category based at least on the previous email having the one or more recipients associated with the second domain.

4. The system of claim 1, wherein the current email and the subsequent email are prevented from being sent to the recipient associated with the second domain by at least one of generating an alert in response to one or more of the adding of the recipient associated with the second domain who is not part of the same user group and the current email or the subsequent email being sent to the recipient associated with the second domain.

5. The system of claim 1, wherein the subsequent email is assigned to the second category further based at least on the subsequent email being a reply or a forward of the current email.

6. The system of claim 1, wherein the subsequent email is assigned to the second category further based at least on the subsequent email having at least one of a similar title, a similar recipient, and a similar extension as the current email.

7. The system of claim 1, wherein the first content comprises a first text included in a first body or a first attachment of the current email, wherein the second content comprises a second text included in a second body or a second attachment of the subsequent email, and wherein the first value matching the second value indicates a match between the first content of the current email and the second content of the subsequent email.

8. The system of claim 7, wherein the at least one data processor is further caused to at least:
   generate the first value representative of the first content of the current email, the first value being a first checksum or a first fingerprint corresponding to the first content of the current email;
   generate the second value representative of the second content of the subsequent email, the second value being a second checksum or a second fingerprint corresponding to the second content of the subsequent email; and
   determine, based at least on the first value matching the second value, that the first content of the current email matches the second content of the subsequent email.

9. The system of claim 1, wherein the at least one data processor is further caused to at least:
   determine, based at least on the metadata associated with the current email, to assign the subsequent email to the first category.

10. The system of claim 1, wherein the subsequent email includes the remaining plurality of recipients from the current email, and wherein the subsequent email is prevented from being sent to the recipient associated with the second domain by at least preventing the remaining plurality of recipients from being modified to include the recipient associated with the second domain.

11. The system of claim 1, wherein the same user group is further defined include a first recipient from a domain and/or exclude a second recipient from a same domain.

12. The system of claim 1, wherein at least one of an email server and an email client is configured to assign the current email and the subsequent to the second category, and prevent the current email and the subsequent email from being sent to the recipient associated with the second domain.

13. The system of claim 1, wherein the current email is assigned, based at least on a policy, to the first category, and wherein the policy defines at least one of a first recipient included in the user group and a second recipient excluded from the user group.

14. The system of claim 13, wherein the policy further specifies one or more actions that are performed in response to the current email and the subsequent email being assigned to the second category, and wherein the one or more actions are performed to prevent the current email and the subsequent email from being sent to the recipient associated with the second domain.

15. A computer-implemented method, comprising:
assigning a current email to a first category based at least on the current email having at least one recipient who is not part of a user group defined to include recipients associated with a first domain but exclude recipients associated with a second domain;
in response a removal of the at least one recipient who is not part of the user group, determining that a remaining plurality of recipients of the current email all belong to the user group;
in response to determining that the remaining plurality of recipients of the current email all belong to the user group, updating a metadata associated with a current email to indicate the current email as being assigned to a second category, the metadata associated with the current email further including a first value representative of a first content of the current email;
assigning, based at least on the first value failing to match a second value representative of a second content of a subsequent email, the subsequent email to the first category to enable the subsequent email to be sent to a recipient associated with the second domain;
assigning, based at least on the first value matching the second value representative of the second content of the subsequent, the subsequent email to the second category; and
preventing, based at least on the current email and the subsequent email being assigned to the second category, the current email and the subsequent email from being sent to the recipient associated with the second domain, the current email and the subsequent email being prevented from being sent to the recipient associated with the second domain by at least preventing the recipient associated with the second domain from being added to the current email and the subsequent email.

16. A non-transitory computer readable medium storing instructions, which when executed by at least one data processor, result in operations comprising:
assigning a current email to a first category based at least on the current email having at least one recipient who is not part of a user group defined to include recipients associated with a first domain but exclude recipients associated with a second domain;
in response a removal of the at least one recipient who is not part of the user group, determining that a remaining plurality of recipients of the current email all belong to the user group;
in response to determining that the remaining plurality of recipients of the current email all belong to the user group, updating a metadata associated with a current email to indicate the current email as being assigned to a second category, the metadata associated with the current email further including a first value representative of a first content of the current email;
assigning, based at least on the first value failing to match a second value representative of a second content of a subsequent email, the subsequent email to the first category to enable the subsequent email to be sent to a recipient associated with the second domain;
assigning, based at least on the first value matching the second value representative of the second content of the subsequent, the subsequent email to the second category; and
preventing, based at least on the current email and the subsequent email being assigned to the second category, the current email and the subsequent email from being sent to the recipient associated with the second domain, the current email and the subsequent email being prevented from being sent to the recipient associated with the second domain by at least preventing the recipient associated with the second domain from being added to the current email and the subsequent email.

* * * * *